United States Patent
Ouhadi et al.

(10) Patent No.: US 7,381,771 B2
(45) Date of Patent: *Jun. 3, 2008

(54) THERMOPLASTIC ELASTOMERS HAVING IMPROVED ADHESIVE PROPERTIES

(75) Inventors: Trazollah Ouhadi, Liege (BE); Gary K. Lawrence, Akron, OH (US); Joseph E. Pfeiffer, Akron, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/181,003

(22) PCT Filed: Jan. 25, 2001

(86) PCT No.: PCT/US01/02482

§ 371 (c)(1),
(2), (4) Date: Jul. 11, 2002

(87) PCT Pub. No.: WO01/55257

PCT Pub. Date: Aug. 2, 2001

(65) Prior Publication Data

US 2003/0083434 A1    May 1, 2003

Related U.S. Application Data

(60) Provisional application No. 60/179,246, filed on Jan. 31, 2000.

(51) Int. Cl.
*C08L 53/02* (2006.01)

(52) U.S. Cl. ............ 525/88; 525/92 C; 525/97; 525/99

(58) Field of Classification Search ............ 525/89, 525/97, 99, 92 C, 88
See application file for complete search history.

(56) References Cited

U.S. PATENT DOCUMENTS

| | | | |
|---|---|---|---|
| 3,037,954 A | 6/1962 | Gessler et al. | |
| 4,107,130 A * | 8/1978 | Gergen et al. | 523/522 |
| 4,130,535 A | 12/1978 | Coran et al. | |
| 4,889,888 A * | 12/1989 | Bassi et al. | 525/75 |
| 4,957,968 A | 9/1990 | Adur et al. | |
| 5,702,827 A * | 12/1997 | Itoh et al. | 428/519 |
| 5,760,134 A | 6/1998 | Guntherberg et al. | |
| 5,843,577 A | 12/1998 | Ouhadi et al. | |
| 5,852,118 A | 12/1998 | Horrion et al. | |
| 5,939,464 A * | 8/1999 | Wang | 521/139 |
| 5,972,519 A * | 10/1999 | Niessner et al. | 428/474.4 |
| 6,846,877 B2 * | 1/2005 | Jacob et al. | 525/88 |
| 7,182,542 B2 * | 2/2007 | Hohlbein | 401/268 |

FOREIGN PATENT DOCUMENTS

| | | |
|---|---|---|
| DE | 19752658 | 6/1988 |
| EP | 0902051 | 3/1999 |
| EP | 0902052 | 3/1999 |
| EP | 1261664 | 9/2004 |
| WO | 01/55257 | 8/2001 |

* cited by examiner

Primary Examiner—Jeffrey C Mullis

(57) ABSTRACT

Adhesive compositions comprising a thermoplastic elastomer and a block copolymer with rigid vinyl aromatic blocks and non-rigid blocks of dienes and vinyl aromatic monomers.

3 Claims, No Drawings

THERMOPLASTIC ELASTOMERS HAVING IMPROVED ADHESIVE PROPERTIES

CROSS REFERENCE TO RELATED APPLICATIONS

This application is a national stage application of International Application PCT/US01/02482 filed Jan. 25, 2001, claiming benefit of U.S. provisional application No. 60/179,246, filed Jan. 31, 2000.

BACKGROUND OF THE INVENTION

1. Field of the Invention

This invention relates generally to thermoplastic elastomer (TPE) materials. Thermoplastic elastomers are broadly defined as rubber-like materials that, unlike conventional vulcanized rubbers, can be processed and recycled like thermoplastic materials, yet have properties and performance similar to that of vulcanized rubber at service temperatures. The invention more specifically relates to thermoplastic elastomers which have been modified by the addition of a specific vinyl aromatic block copolymer. The compositions of the invention have improved adhesive properties with respect to polymeric substrates, and particularly with respect to engineering thermoplastics.

2. Description of the Prior Art

Blends which have a combination of both thermoplastic and elastic properties are generally obtained by combining a thermoplastic resin with an elastomeric material in a way such that the elastomer is intimately and uniformly dispersed as a discrete particulate phase within a continuous phase of the thermoplastic. Early work with the vulcanization of the elastomer phase is found in U.S. Pat. No. 3,037,954 which discloses static vulcanization, as well as dynamic vulcanization wherein a vulcanizable elastomer is dispersed into a resinous thermoplastic polymer and the elastomer is cured (crosslinked) while continuously mixing and shearing the blend.

U.S. Pat. No. 4,130,535 discloses thermoplastic elastomer compositions comprising thermoplastic olefin resins and olefin copolymer rubbers, prepared by dynamic vulcanization and wherein the rubber component is vulcanized to the extent that it is essentially insoluble in conventional rubber solvents. No details are given regarding adhesion properties of these compositions, but it is known that unmodified non-polar thermoplastic elastomers generally do not adhere to engineering resins.

Efforts to improve the adhesive properties of thermoplastic elastomers have been made through the incorporation of functionalized thermoplastic resins into the blends. One approach is described in U.S. Pat. No. 4,957,968 which discloses the addition of a functionalized polyolefin to improve adhesion to metals and polar polymers. U.S. Pat. No. 5,843,577 describes the incorporation of copolymers of polyamide and functionalized polyolefin to improve adhesion to polyamides. U.S. Pat. No. 5,852,118 discloses the addition of block copolymers of functionalized olefin, thermoplastic polyurethane, copolyester or copolyamide, and an isocyanate.

However, the problem of achieving good adhesion of thermoplastic elastomers to polymer substrates, and particularly to polar engineering thermoplastic substrates, either has not been overcome by these approaches or the techniques are too complex for practical application.

SUMMARY OF THE INVENTION

The present invention is based on the discovery that a thermoplastic elastomer composition having improved adhesion is provided by incorporating into the TPE a flexible block copolymer composed of blocks of vinyl aromatic monomers and blocks of dienes and vinyl aromatic monomers, and having a specific molecular structure. In detail the present invention relates to a thermoplastic elastomer composition comprising (a) from about 25 to about 90 weight percent of a thermoplastic elastomer;

(b) from about 10 to about 75 weight percent of a block copolymer of rigid blocks of vinyl aromatic monomers (S) and non-rigid blocks of dienes and vinyl aromatic monomers (B/S) containing at least the block structure S-B/S-S, and wherein the diene content is less than about 40 weight percent of the total block copolymer and the non-rigid blocks B/S amount to at least about 50 weight percent of the total block copolymer.

The thermoplastic elastomer component (a) can be an olefinic thermoplastic elastomer wherein a thermoplastic olefin polymer and an olefin rubber are blended under conditions of heat and shear in the presence of a curative to at least partially vulcanize (crosslink) the rubber component to form a thermoplastic vulcanizate (TPV). The thermoplastic elastomer component (a) can also be a styrenic block copolymer, or a mixture of olefinic and styrenic thermoplastic elastomers.

In a further embodiment of the invention thermoplastic polyurethanes can also be incorporated into the compositions.

DESCRIPTION OF THE PREFERRED EMBODIMENTS

Olefinic Thermoplastic Elastomer

Thermoplastic Olefin Polymer Component

Polyolefins suitable for use in the compositions of the invention include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being most preferred. As used in the specification and claims the term polypropylene includes homopolymers of propylene as well as reactor and/or random copolymers of propylene which can contains about 1 to about 30 weight percent of ethylene and/or an alpha-olefin comonomer of 4 to 16 carbon atoms, and mixtures thereof. The polypropylene can have different types of crystalline structure such as isotactic or syndiotactic, and different degrees of crystallinity including materials with a high percentage of amorphous structure such as the "elastic" polypropylenes. Further polyolefins which can be used in the invention are high, low, linear-low and very low density polyethylenes, and copolymers of ethylene with (meth) acrylates and/or vinyl acetates.

The polyolefins mentioned above can be made using conventional Ziegler/Natta catalyst systems or by single site catalyst systems. Commercially available polyolefins may be used in the practice of the invention.

The amount of thermoplastic polyolefin found to provide useful thermoplastic elastomer compositions is generally from about 8 to about 90 weight percent, with the proviso that the total amount of polyolefin and olefinic rubber is about 35 weight percent based on the total weight of the thermoplastic polyolefin, olefin rubber and optional additives. Preferably, the thermoplastic polyolefin content will range from about 10 to about 60 percent by weight.

Olefin Rubber Component

Suitable monoolefin copolymer rubbers include non-polar, rubbery copolymers of two or more alpha-monoolefins, preferably copolymerized with at least one polyene, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); and vinyl norbornene (VNB).

Butyl rubbers are also useful in the thermoplastic elastomer compositions. As used in the specification and claims, the term butyl rubber includes copolymers of an isoolefin and a conjugated monoolefin, terpolymers of an isoolefin with or without a conjugated monoolefin, divinyl aromatic monomers and the halogenated derivatives of such copolymers and terpolymers. Another suitable copolymer within the scope of the olefin rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from about 0.1 to about 10 weight percent. A preferred example is the brominated copolymer of isobutylene and para-methylstyrene. Natural rubbers are also olefin rubbers suitable for use in the thermoplastic elastomer composition.

The amount of olefin rubber in the thermoplastic elastomer generally ranges from about 70 to about 10 weight percent, with the proviso that the total amount of thermoplastic polyolefin and olefin rubber is at least about 35 weight percent, based on the weight of the polyolefin, rubber and optional additives. Preferably the olefin rubber content will be in the range of from about 50 to about 10 weight percent.

Additives

The thermoplastic elastomer may optionally contain reinforcing and non-reinforcing fillers, plasticizers, antioxidants, stabilizers, rubber processing oils, extender oils, lubricants, antiblocking agents, antistatic agents, waxes, foaming agents, pigments, flame retardants and other processing aids known in the rubber compounding art. Such additives may comprise up to about 65 weight percent, more preferably up to about 50 weight percent, of the total composition. Fillers and extenders which can be utilized include conventional inorganics such as calcium carbonate, clays, silica, talc, titanium dioxide, carbon black and the like. The rubber processing oils generally are paraffinic, napthenic or aromatic oils derived from petroleum fractions. The oils are selected from those originally used in conjunction with the specific rubber or rubber component present in the composition.

Processing

The olefin rubber component of the olefinic thermoplastic elastomer is generally present as small, i.e. micro size, particles within a continuous polyolefin matrix, although a co-continuous morphology or a phase inversion is also possible depending upon the amount of rubber relative to thermoplastic resin and the degree of vulcanization, if any, of the rubber. Preferably, the rubber is at least partially vulcanized, and most preferably it is fully vulcanized (crosslinked).

The partial or full crosslinking can be achieved by adding an appropriate rubber curative to the blend of thermoplastic olefin polymer and olefin rubber, and vulcanizing the rubber to the desired degree under vulcanizing conditions. It is preferred that the rubber be crosslinked by the process of dynamic vulcanization. As used in the specification and claims, the term dynamic vulcanization means a vulcanization or crosslinking (curing) process wherein the rubber is vulcanized under conditions of shear at a temperature above the melting point of the polyolefin component.

Those of ordinary skill in the art will appropriate the appropriate quantities and types of vulcanizing agents, and the conditions required to achieve the desired vulcanization. Any known crosslinking system can be used, so long as it is suitable under the vulcanization conditions for the elastomer component and it is compatible with the thermoplastic olefin polymer component of the composition. Crosslinking (curing) agents include sulfur, sulfur donors, metal oxides, phenolic resin systems, maleimides, peroxide based systems, hydrosilylation systems, high energy radiation and the like, both with and without accelerators and co-agents.

The terms fully vulcanized or completely vulcanized as used herein mean that the olefin rubber component of the composition has been crosslinked to a state in which the elastomeric properties of the crosslinked rubber are similar to those of the rubber in its conventional vulcanized state, apart from the thermoplastic elastomer composition. The degree of crosslinking (or cure) of the rubber can also be expressed in terms of gel content, crosslink density or amount of uncrosslinked rubber which is extractable by a rubber solvent. All of these descriptions are well known in the art.

Usually about 5 to about 20 parts by weight of the crosslinking agent or system are used per 100 parts by weight of the rubber component to be vulcanized.

Styrenic Thermoplastic Elastomer

Another thermoplastic elastomer useful in the invention is a block copolymer of styrene/conjugated diene/styrene, with the conjugated diene optionally being fully or partially hydrogenated, or mixtures thereof. Generally this block copolymer may contain about 10 to about 50 weight %, more preferably about 25 to about 35 weight %, of styrene and about 90 to about 50 weight %, more preferably about 75 to about 35 weight % of the conjugated diene, based on said block copolymer. Most preferred, however, is a block copolymer which contains about 30 weight % of styrene and about 70 weight % of the conjugated diene. The conjugated diene is selected from butadiene, isoprene or mixtures thereof. Specific block copolymers of the styrene/conjugated diene/styrene type are SBS, SIS, SIBS, SEBS and SEPS block copolymers. These block copolymers are known in the art and are commercially available.

Optionally the block copolymer may be further compounded with a polyolefin or a common additive or mixtures thereof. Thus, the styrenic thermoplastic elastomer optionally further comprises up to about 60 weight % of such polyolefin homopolymer or copolymer, or the additives or mixtures thereof, based on the total weight of the block copolymer and the polyolefin and/or additives. Preferably, the styrenic thermoplastic elastomer comprises at least 10 weight % of the polyolefin. The thermoplastic polyolefins are selected from those mentioned above in context with the olefinic thermoplastic elastomers.

The thermoplastic elastomer component of the invention may also be blends of the olefinic thermoplastic elastomer (comprising the polyolefin, rubber and optional additives) with the styrenic thermoplastic elastomer (comprising the block copolymer, optional polyolefin and/or additives). Preferred blends contain about 5 to about 95 weight % of olefinic thermoplastic elastomer and about 95 to about 5 weight % of styrenic thermoplastic elastomer respectively, based on the total weight of the thermoplastic elastomer component. These blends can be prepared by common blending processes known in the art.

The thermoplastic elastomer component of the compositions generally is present in an amount from about 25 to about 90 weight %, based on the total weight of thermoplastic elastomer and flexible block copolymer. Preferably it is present from about 25 to about 85 weight %, and most preferably from about 50 to about 75 weight %.

Thermoplastic Polyurethane

In a further embodiment of the invention, a thermoplastic polyurethane (TPU) can be included in the adhesive composition. The TPU component has no limitation with respect to its formulation other than the requirement that it be thermoplastic in nature, which means that it is prepared from substantially disfunctional ingredients, i.e. oragnic diisocyanates and components being substantially difunctional in active hydrogen containing groups. However, often minor proportions of ingredients with functionalities higher than two may be employed. This is particularly true when using extenders such as glycerol, trimethylol propane, and the like. Any of the TPU materials known in the art can be employed within the scope of the present invention.

The preferred TPU is a polymer prepared from a mixtures comprising at least one organic diisocyanate, at least one polymeric diol and at least one difunctional extender. The TPU can be prepared by prepolymer, quasi-prepolymer or one-shot methods commonly used in the art.

The TPU component may be incorporated in amounts ranging from about 10 to about 50 weight %, and preferably from about 15 to about 35 weight %, based on the total of thermoplastic elastomer, TPU and flexible block copolymer.

Flexible Block Copolymer

The composition of the invention includes a flexible block copolymer component, which is comprised of a block copolymer containing rigid blocks of vinyl aromatic monomers (S) and statistical non-rigid mid-blocks of diene/vinyl aromatic monomers (B/S). These block copolymers contain at least the block structure S-B/S-S. The glass transition temperature ($T_g$) of block S is generally about 25° C. and that of the block B/S is generally below 25° C. The B/S blocks is composed of block 75 to 30 weight percent vinyl aromatic monomer and about 25 to 70 weight percent diene monomer. Particularly preferred flexible B/S blocks have a vinyl aromatic monomer content of about 60 to 40 weight percent and a diene monomer content of about 40 to 60 weight percent. With respect to the total block copolymer component the diene content is less than about 40 weight percent, preferably about 35 weight percent, and the portion of the non-rigid B/S blocks amounts to at least about 50 weight percent, preferably about 70 weight percent. The block copolymer component has a low modulus and yield strength, with high elongation.

Suitable vinyl aromatic monomers includes styrene, alkyl-substituted styrenes such as p-methylstyrene, vinyltoluene, as well as mixtures of said monomers. The preferred monomer is styrene. Suitable diene monomers include 1,3-butadiene, isoprene, piperylene, phenylbutadiene, and mixtures of said monomers. The preferred monomer is 1,3-butadiene. The conjugated diene monomer can also be fully or partially hydrogenated.

The block copolymers useful in the thermoplastic elastomer compositions of the invention are known in the art, and are further described in Canadian Pat. No. 2,193,264 and in International Pat. Applications WO 96/20248; WO 96/23823; WO 98/12240; and WO 99/46330. They are generally prepared by butyl lithium initiated sequential anionic polymerization, but coupling of living S-B/S diblocks or bifunctional initiation are also known methods.

The amount of the block copolymer component in the composition of the invention generally ranges from about 10 to about 75 weight percent, based on the total weight of the composition including the thermoplastic elastomer component, additives and the flexible block copolymer component. The preferred amount of flexible block copolymer ranges from about 15 to about 75 weight percent, with about 25 to about 50 weight percent being most preferred.

EXAMPLES

The following general procedure was used in the preparation of thermoplastic elastomers of the invention. The compositions were prepared in a typical thermoplastic compounding twin screw extruder, although other conventional mixing devices such as Banbury mixers, Farrel continuous mixers and the like are also satisfactory. The pellets of block copolymer were preblended with the thermoplastic elastomer component, and the blend was added to the extruder using a loss-in-weight belt feeder. The extrusion was set up to reach a melt temperature of at least about 180° C. but not higher than about 220° C. One extruder vent was used as a vacuum port to remove trace volatiles and to prevent porosity in the extruded composition. The compositions were finished into spherical pellets using an underwater pelletizer. After pelletizing, the compositions were molded into plaques for the determination of physical properties or were molded as described below for use in the peel test.

The compositions of the invention are rubbery materials having tensile set values of about 50% or less, which meet the standards for rubber as defined by ASTM D1566. Preferred compositions have a Shore A hardness of about 65 or below and/or a tensile modulus (100%) of about 270 psi or lower.

The adhesive composition of the invention has unexpectedly improved adhesion to thermoplastic substrates such as terpolymers of acrylonitrile. butadiene, and styrene (ABS), polycarbonate (PC), ABS/PC alloys and blends, polystyrene (PS), high impact polystyrene (HIPS), polyphenylene oxide (PPO), polymethyl methacrylate (PMMA), polybutylene terephtalate (PBT), polyethylene terephthalate (PET), acrylonitrile styrene acrylic (ASA), polypropylene, polyethylene and other olefinic polymers, including blends and alloys of these polymers, as well as glass and mineral filled versions thereof. The compositions therefore can be used in processes for making shaped articles by conventional processes such as co-injection molding, co-extrusion molding, co-blow molding (injection and extrusion), lamination, calendering, overmolding by compression and injection, insert molding, and over-extrusion. The shaped articles obtained by these processes are multilayer articles comprising at least one layer of a polymer substrate and at least one layer of the adhesive composition according to the invention. The adhesive composition and the molded and shaped articles made therefrom are useful in a variety of applications such as non-slip grips, soft touch labels and coatings, and consumer electronic, tool and appliance parts.

The following measurement methods were used in evaluating the examples of the invention:

Tensile strength at break; tensile set; tensile modulus; elongation at break—ASTM D412 (ISO 37, type 2)
Shore hardness—ASTM D2240
Tear strength—ASTM D624
Specific gravity—ASTM D792

Adhesion of the compositions of the invention was measured by a peel test modeled after ASTM D 1876, with the modification that a hard and soft substrate was used in place of two soft substrates. Also, since adhesion is obtained at the substrate interface due to the inventive composition, no separate adhesive layer exists. For evaluation of insert molding conditions the harder thermoplastic substrates were produced in an "L" shaped mold cavity, then were removed and allowed to cool to ambient temperature. The spaced plastic profile was then inserted into another mold with a "T" shaped cavity, so as to take up one-half of the cavity. The molten composition of the invention was then injection molded onto the exiting "L" to produce a "T-bar" article. For evaluation of compression molding conditions the thermoplastic "L" is produced as described, but is not removed from the mold. By either rotating the mold cavity to the next station or by using a sliding core plate, the molded "L" is immediately made accessible in a "T" cavity and the molten composition of the invention is injected. A standard tensiometer was then used to measure peel values for the "T-bars", by placing each tab on the upper "T" in separate grips. The grips were then pulled apart at 180 degrees. The force to peel was plotted against the crosshead travel which is also the peel length down the profile. The curve typically reached a peak and then descended to a plateau. The plateau values were recorded as the adhesion, expressed as pounds per linear inch (pli).

The properties of compositions of the invention, and their adhesion to ABS and PC substrates are set forth in Tables 1 and 2

TABLE 2

| Example No. - | 11 | 12 | 13 | 14 | 15 | 16 |
|---|---|---|---|---|---|---|
| Component (wt. %) | | | | | | |
| SP8211 - 45W237 | 65 | 65 | 65 | 65 | 65 | |
| Styroflex BX6105 | 35 | 25 | 17.5 | 25 | 17.5 | 35 |
| Elastollan 1185 | | 10 | 17.5 | | | |
| Elastollan C85A | | | | 10 | 17.5 | |
| Thermolast K - TC6AAZ | | | | | | 65 |
| Adhesion (pli) | | | | | | |
| ABS | 19 | 16 | 7.5 | 20.5 | 17 | 8.5 |
| PC | 26.5 | 20 | 13 | 22.5 | 12 | 15 |

Adhesive compositions of the invention were prepared by blending 65 weight % SP8211-55W237 thermoplastic elastomer with 35 weight % Styroflex BX6150 flexible block copolymer. Adhesion to various polymeric substrates was tested by the insert molding technique described earlier. Results of the peel strength tests are set forth in Table 3. In the description of the adhesion mode, the notation "cohesive" means that peel or failure occurred in the body of either the substrate or the thermoplastic elastomer of the invention. The notation "adhesive" means that the peel or failure occurred at the interface between the substrate and the thermoplastic elastomer of the invention.

TABLE 3

| Substrate | Adhesion (pli) | Adhesion Mode |
|---|---|---|
| Polycarbonate (PC) | 29 | Cohesive |
| Acrylonitrile/butadiene/styrene (ABS) | 21 | Adhesive |
| PC/ABS blend | 29 | Cohesive |
| PC - 30% glass filled | 23 | Cohesive |
| Crystal polystyrene (PS) | 29 | Cohesive |
| High impact polystyrene (HIPS) | 29 | Cohesive |
| Polymethyl methacrylate (PMMA) | 19 | Adhesive |
| Acylic styrene acrylonitrile (ASA) | 15 | Adhesive |
| ASA/PC | 17 | Adhesive |
| PC/polybutylene terephthalate (PBT) | 21 | Adhesive |

TABLE 1

| Example No. - | 1 | 2 | 3 | 4 | 5 | 6 | 7 | 8 | 9 | 10 |
|---|---|---|---|---|---|---|---|---|---|---|
| Component (wt. %) | | | | | | | | | | |
| SP8211 - 45W237 | | | | | | | | 70 | 100 | |
| SP9911 - 45W237 | 70 | 75 | 65 | 60 | 60 | 55 | 50 | | | 100 |
| Styroflex BX6105 | 30 | 25 | 35 | 30 | 40 | 45 | 50 | 30 | | |
| Septon 4055 | | | | 10 | | | | | | |
| Properties | | | | | | | | | | |
| Hardness (ShoreA) | 52 | 51 | 55 | 58 | 60 | 61 | 63 | 55 | 45 | 45 |
| Tensile at break (psi) | 580 | 540 | 610 | 930 | 920 | 1100 | 1210 | 610 | 475 | 500 |
| Elongation at break (%) | 590 | 590 | 640 | 710 | 740 | 770 | 780 | 540 | 500 | 450 |
| Tensile modulus (100% psi) | 210 | 190 | 210 | 210 | 230 | 230 | 240 | 210 | 200 | |
| Tensile set (%) | 11 | 9 | 9 | 9 | 9 | 9 | 9 | | 5 | |
| Adhesion (pli) | | | | | | | | | | |
| ABS (insert mold) | 17 | 12 | 23 | 18 | 20 | 23 | 25 | 18 | <1 | <1 |
| PC (insert mold) | 28 | | | | | | | | <1 | <1 |
| ABS (compression mold) | 26 | | | | | | | | | |
| PC (compression mold) | 37 | | | | | | | | | |

TABLE 3-continued

| Substrate | Adhesion (pli) | Adhesion Mode |
|---|---|---|
| Polyethylene terephthalate (PET) | 17.5 | Adhesive |
| Polypropylene (PP) | 25 | Cohesive |
| Polyphenylene oxide (PPO) | 21 | Cohesive |

Abbreviations and product names used in the tables are defined as follows:

SP8211-45W237—Santoprene® thermoplastic elastomer based on polypropylene and vulcanized EPDM rubber (Advanced Elastomer Systems, L.P.)

SP8211-55W237—Santoprene® thermoplastic elastomer based on polypropylene and vulcanized EPDM rubber (Advanced Elastomer Systems, L.P.)

SP9911-45-W237—Santprene® thermoplastic elastomer based on polypropylene and vulcanized EPDM rubber (Advanced Elastomer Systems, L.P.)

Styroflex® BX6105—Flexible styrene-butadiene block copolymer (BASF Aktiengesellschaft)

Septon® 4055—Thermoplastic elastomer SEPS block copolymer (Kuraray Co., Ltd.)

Elastollan® 1185—Polyether based thermoplastic polyurethane (BASF Corp.)

Elastollan® C85A—Polyester based thermoplastic polyurethane (BASF Corp.)

Thermolast K™—Compounded TPE based on SEBS (Gummiwerk Kraiburg)

ABS—Acrylonitrile-butadiene-styrene terpolymer resin (Cycolac® 5600-GE)

PC—Polycarbonate resin (GE)

The invention claimed is:

1. An adhesive composition comprising
    (a) from 50 to 75 weight percent of a thermoplastic elastomer comprising a blend of a polypropylene and dynamically vulcanized ethylene-propylene-nonconjugated diene terpolymer rubber, and
    (b) from 25 to 50 weight percent of a block copolymer comprising rigid blocks of styrene and non-rigid blocks of 1,3-butadiene and styrene containing at least the block structure styrene-1,3-butadiene/styrene-styrene, wherein the 1,3-butadiene content is less than 40 weight percent of the total block copolymer and the non-rigid blocks amount to at least 50 weight percent of the total block copolymer, based on the total weight of (a)+(b) and wherein the composition exhibits a tensile set according to ASTM D412 of 11% or less.

2. The composition of claim 1 further comprising from about 10 to about 50 weight percent of a thermoplastic polyurethane (c) based on the total weight of (a)+(b)+(c).

3. A method for the preparation of an adhesive composition, comprising the steps of blending
    (a) from 50 to 75 weight percent of a thermoplastic elastomer comprising a blend of polypropylene and dynamically vulcanized ethylene-propylene-nonconjugated diene terpolymer rubber with
    (b) from 25 to 50 weight percent of a block copolymer comprising rigid blocks of styrene and non-rigid blocks of 1,3-butadiene and styrene containing at least the block structure styrene-1,3-butadiene/styrene-styrene wherein the 1,3-butadiene content is less than 40 weight percent of the total block copolymer and the non-rigid blocks amount to at least 50 weight percent of the total block copolymer, based on the total weight of (a)+(b) and wherein the composition exhibits a tensile set according to ASTM D412 of 11% or less.

* * * * *